United States Patent [19]

Ulbing

[11] Patent Number: 4,848,184
[45] Date of Patent: Jul. 18, 1989

[54] ROTARY/LINEAR ACTUATOR

[75] Inventor: Otmar M. Ulbing, Fairport, N.Y.

[73] Assignee: Windwinder Corporation, Tipp City, Ohio

[21] Appl. No.: 187,571

[22] Filed: Apr. 28, 1988

Related U.S. Application Data

[63] Continuation-in-part of Ser. No. 092,955, Sep. 4, 1987.

[51] Int. Cl.[4] .......................................... F16H 37/00
[52] U.S. Cl. .................................................. 74/640
[58] Field of Search .................................... 74/640

[56] References Cited

U.S. PATENT DOCUMENTS

| | | | |
|---|---|---|---|
| 2,276,195 | 3/1942 | Holmes | 137/139 |
| 2,882,428 | 4/1959 | Frisch | 310/83 |
| 2,893,276 | 7/1959 | Quackenbush | 77/34.4 |
| 2,906,143 | 9/1959 | Musser | 74/640 |
| 2,918,827 | 12/1959 | Brown | 74/424.8 |
| 2,943,465 | 7/1960 | Musser | 464/160 |
| 2,943,508 | 7/1960 | Musser | 74/424.8 |
| 2,979,964 | 4/1961 | Musser | 74/424.8 |
| 3,065,645 | 11/1962 | Musser | 74/127 |
| 3,077,792 | 2/1963 | Kinderman | 74/640 |
| 3,117,763 | 1/1964 | Musser | 251/165 |
| 3,147,631 | 9/1964 | Larsh | 74/89 |
| 3,159,758 | 12/1964 | Hemperly, Jr. et al. | 310/83 |
| 3,356,874 | 12/1967 | Chiapparelli et al. | 310/83 |
| 3,374,372 | 3/1968 | Tinder et al. | 310/80 |
| 3,415,144 | 12/1968 | Carson | 74/640 |
| 3,495,108 | 2/1970 | Van Buskirk | 310/68 |
| 3,512,421 | 5/1970 | Anderson | 74/89.15 |
| 3,548,227 | 12/1970 | Woodward | 310/83 |
| 3,730,016 | 5/1973 | Miller | 74/424.8 B |
| 3,895,288 | 7/1975 | Lampen et al. | 323/94 R |
| 4,041,795 | 8/1977 | Rekoff, Jr. | 74/424.8 B |
| 4,482,828 | 11/1984 | Vergues et al. | 310/83 |
| 4,557,153 | 12/1985 | Ulbing | 74/2 |
| 4,719,816 | 1/1988 | Carlnäs | 74/625 |

FOREIGN PATENT DOCUMENTS 60-84440  5/1985  Japan ..................... 74/640

Primary Examiner—Leslie A. Braun
Assistant Examiner—Scott Anchell
Attorney, Agent, or Firm—Bean, Kauffman & Spencer

[57] ABSTRACT

There is disclosed a rotary/linear actuator, wherein a flexible sleeve member having a screw thread on its outer surface is arranged to surround a rotary component and a drive motor therefor; the rotary component resiliently deforming the screw thread of the sleeve member outwardly into engagement with an internally threaded outer sleeve member for purposes of imparting linear movement to the sleeve member incident to driven rotations of the rotary component. The actuator incorporates a potentiometer for producing a signal indicative of the position of the sleeve member.

10 Claims, 1 Drawing Sheet

ROTARY/LINEAR ACTUATOR

REFERENCE TO RELATED APPLICATION

This is a continuation-in-part application of U.S. Pat. application Ser. No. 07/092,955, filed Sept. 4, 1987.

BACKGROUND OF THE INVENTION

This invention generally relates to power transmission devices or actuators of the rotary-to-linear motion converting type.

More particularly, the present invention is directed to rotary-to-linear actuators of the general type disclosed in my co-pending U.S. Pat. application Ser. No. 07/092,955, filed Sept. 4, 1987, wherein a rotary component is fixed against axial displacement during operation of the actuator and serves to deform the external screw threads of a rotatably fixed thin walled flexible sleeve outwardly into threaded engagement with the rotatably and axially fixed internal screw threads of an outer member, so as to impart axial movements to the flexible sleeve.

SUMMARY OF THE INVENTION

The present invention is directed towards certain improvements in a rotary-to-linear actuator of the type disclosed in my co-pending U.S. Pat. application Ser. No. 07/092,955, filed Sept. 4, 1987, which allows for a substantially greater overall stroke extent of axial movement of the flexible sleeve of the actuator for a similarly sized unit. The present actuator additionally permits a comparative reduction in the overall length of the actuator for any given stroke of the flexible sleeve as a result of the mode of mounting a potentiometer of the actuator.

In the present actuator, the flexible sleeve is radially and axially sized to surround both the rotary component and drive motor of the actuator, so as to maximize the permissive length of the flexible sleeve and thus its stroke or the axial distance through which same may be displaced, as an incident to driven rotation of the rotary component by the motor. The motor is cantilever supported by an end of the casing or housing of the actuator remotely of the rotary member, so as to allow for radial displacements of the rotary actuator as required to compensate for lack of perfect concentricity between the motor, rotary component, flexible sleeve and that portion of the actuator casing serving to define a stationary threaded member with which the flexible sleeve threadably engages upon driven rotations of the rotary component.

Further, in accordance with the present invention, the actuator incorporates a touch controlled potentiometer having its control element supported by the casing of the actuator radially outwardly of the motor to extend axially thereof and its force applying element carried directly by the flexible sleeve and on an end thereof arranged relatively adjacent that end of the casing serving to provide cantilever support for the motor. As such, the potentiometer is not limiting on the length of stroke of the flexible sleeve or the overall length of the casing of the actuator.

BRIEF DESCRIPTION OF THE DRAWINGS

The nature and mode of operation of the present invention will now be more fully described in the following detailed description taken with the accompanying drawings wherein.

DETAILED DESCRIPTION

Figure 1:
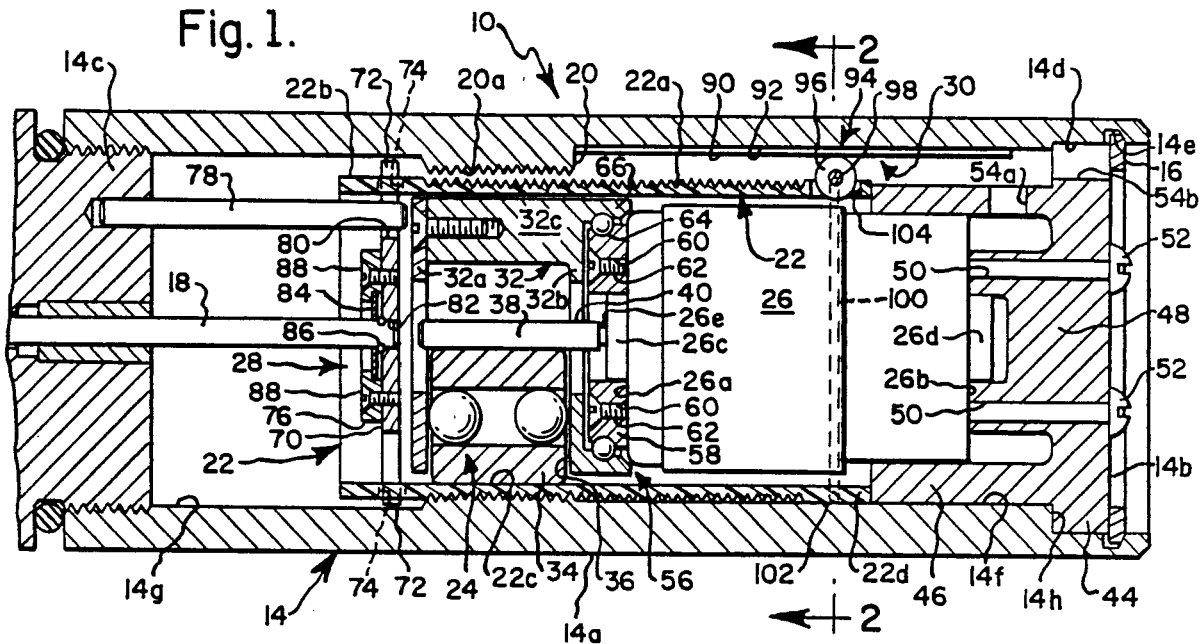
FIG. 1 is a sectional view of an actuator formed in accordance with a preferred form of the present invention.

Reference is first made to FIG. 1, wherein a rotary/linear actuator formed in accordance with a preferred form of the present invention is generally designated as 10.

Actuator 10 generally includes a generally cylindrical housing or casing 14 formed with an open ended central section 14a and a pair of end sections 14b and 14c; end section 14b being retained in assembled condition within an enlarged end bore 14d opening through one end of the central section by suitable means, such as a resilient snap ring retainer 16 fitted within an annular mounting or retaining recess 14e, and section 14c being threadably assembled within an opposite or second end of the central section and apertured to allow a displaceable actuator member, such as rod 18, to project outwardly of the housing for connection to an art device, such as a valve spool, not shown, to be subjected to linear displacements under the control of actuator 10. For the case wherein rod 18 is connected to a valve spool, end section 14c may be adapted for attachment to the valve casing housing such valve spool, so as to both provide a closure for one end of the valve casing and a convenient support for actuator 10. In the present construction, central section 14a is provided with a radially inwardly enlarged section 20, which is spaced axially of its opposite ends and serves to define an internally screw threaded portion 20a. Central section 14a also includes bores 14f and 14g, which extend in opposite directions from enlarged section 20; bore 14f being joined to end bore 14d by an annular abutment surface 14h.

Actuator 10 additionally includes a flexible sleeve 22, which serves to define an externally screw threaded portion 22a; a rotary component or means 24 arranged inwardly of sleeve 22 in engagement with peripherally separate portions of its inner surface; an electrically powered motor 26 for effecting oppositely directed rotations of rotary component 24; means 28 for connecting sleeve 22 to rod 18 and constraining the sleeve against rotation relative to housing 14, while permitting reciprocation of the sleeve lengthwise of the housing; and a touch controlled potentiometer 30 for producing a signal indicative of the position of sleeve 22 and thus the art device to which rod 18 is connected.

Sleeve 22 is preferably formed of a resiliently deformable material, such as a Nylon alloy having self-lubricating properties, and has a minimum wall thickness as required to provide for a maximum cycle life for any design loading condition. The degree of resiliency of the sleeve must necessarily be sufficient to permit radially directed deformations thereof, as required for mating engagement of threaded portions 20a and 22a. On the other hand, the sleeve must possess sufficient rigidity in a direction extending axially thereof to resist crushing or buckling thereof under operational loading conditions, as the sleeve is linearly displaced for purposes of moving rod 18 in the manner to be described. In accordance with a presently preferred form of the invention, sleeve 22 is provided with a relatively short, non-threaded end section 22b adapted for attachment to connecting and constraining means 28, and the axial length of threaded portion 22a is approximately equal to the distance through which rod 18 is to be displaced, plus the effective axial length of rotary component 24 disposed in engagement with the sleeve. The outer diameter of the non-threaded end section 22b is preferably intermediate the diameter of the roots and crests of the threads forming threaded portion 22a. The inner diameter of sleeve 22 is correlated with the outer diameters of rotary component 24 and motor 26, such that the sleeve may be properly deformed by the rotary component, as required for engagement of threaded portions 20a and 22a, while being free to move axially of the motor in the absence of frictional engagement therebetween.

Rotary component 24 generally includes a cage 32 defined by a pair of ring-shaped end walls 32a and 32b interconnected to assume a parallel relationship by a plurality of connecting legs 32c; roller devices 34 received one within each of a plurality of radially opening recesses 36, which have their radially disposed inner ends arranged in communication and are defined by the end walls and connecting legs; and a roller device drive/supporting shaft 38 arranged to be freely received within the cage for frictional driving engagement with each of the roller devices. The elements of rotary component 24 are sized such that roller devices 34 project radially outwardly of cage 32 for engagement with peripherally separate portions 22c of the inner surface of sleeve 22 and serve to force radially aligned areas of externally screw threaded portion 22a to move outwardly to lie in threaded engagement with internally screw threaded portion 20a. In the presently preferred construction, roller devices 34 are three in number and disposed for rotation about uniformly annularly spaced axes disposed parallel to a rotational axis 40 of cage 32, which is arranged coincident with the axis of shaft 38. A more complete description of the construction of rotary component 24 may be had by referring to my co-pending U.S. Pat. application Ser. No. 07/092,955, filed Sept. 4,1987 whose disclosure is incorporated by reference herein.

Motor 26 is of generally cylindrical construction having first and second or opposite ends having end surfaces 26a and 26b fitted with projecting bushings 26c and 26d, which serve to support a motor drive shaft 26e sized and arranged to project outwardly of the motor casing through bushing 26c for driving connection with shaft 38. End surfaces 26a and 26b are provided with threaded mounting openings, not shown, for the purpose to be described.

Motor 26 is cantilever supported within casing 14 by end section 14b, which includes a base portion 44 clamped within bore 14d against surface 14h by ring 16; an outer sleeve portion 46, which has its outer and inner cylindrical surfaces sized to be slidably fitted within bore 14f and to slidably receive the outer surface of motor 26, respectively; and a central hub projection 48 arranged to engage with motor end surface 26b and recessed to slidably receive bushing 26d. Base portion 44 and central hub portion 48 are provided with axially extending bore openings 50 sized to receive mounting screws 52 threadably received within the above mentioned mounting openings formed in motor end surface 26b. End section 14b may be provided with suitably arranged openings, such as are designated at 54a and 54b, to receive electrical leads passing to motor 26 and potentiometer 30. It has been found that frictional forces resulting from the clamping of end section 14b within bore 14d is sufficient to overcome the tendency of motor 26 to rotate relative to casing central section 14a. However, if desired, a key or other suitable device, not shown, may be provided to positively fix end section 14b against rotation.

Motor 26 serves in turn to cantilever support rotary component 24 inwardly of flexible sleeve 22 and in radial alignment with casing enlarged section 20 by a bearing device 56. Bearing device 56 includes a bearing ring 58, which is sized to slidably receive motor bushing 26 and formed with axially extending bore openings 60 sized to receive mounting screws 62 threadably received within the above mentioned mounting openings formed in motor end surface 26a, and a plurality of bearing elements, such as balls 64, received within facing, radially opening grooves or races defined by bearing ring 56 and an annular extension 66 formed integrally with caee end wall 32b.

Connecting and constraining means 28 is arranged within casing bore 14g and includes a connector plate 70, which is disposed to extend transversely of sleeve 22 and provided at its opposite ends with two pairs of lugs 72 and 72 sized to be slidably received within two pairs of apertures 74 and 74 formed in the flexible sleeve end section 22b, only one lug and aperture of each pair being shown in FIG. 1; a mounting plate 76, which serves to secure rod 18 to the connector plate; and a guide pin 78, which is fixed to housing end section 14c and slidably received within a guide slot 80 defined by one pair of lugs 72 in order to constrain the connector plate, and thus the flexible sleeve, against rotation about axis 40, while permitting reciprocating movements thereof lengthwise of housing 14. Preferably, rod 18 is properly positioned and connected to connector plate 70 by the arrangement shown in FIG. 1 as including an aperture 82 defined by connector plate 70 for slidingly receiving rod 18 and a Belleville washer(s) 84 acting against mounting plate 76 and a snap ring retainer 86 carried by the rod for biasing the snap ring retainer into engagement with the connector plate. The connector and mounting plates may be suitably connected, as by threaded fasteners 88.

Touch controlled potentiometer 30 serves to provide an output signal indicative of the axial position of rod 18 relative to housing 14. Potentiometer 30 includes a touch sensitive or responsive control element or section 90, which extends parallel to axis 40 and is arranged within a recess 92 formed in central section 14a to open inwardly of bore 14f and a force applying element 94 carried for movement with flexible sleeve 22. Control element 90 is comprised of coextensive, elongated resistant and conductive members, not shown, which are normally disposed in a spaced relationship, but adapted to be moved into engagement by a force applied at any point along their lengths by element 94 to provide a voltage gradient indicative of the position of such point.

Force applying element 94 is preferably in the form of a roller 96, which is journally adjacent the midpoint of a C-shaped resiliently deformable mounting ring 98, which is positionally located within a discontinuous groove 100 arranged to extend annularly of an end section 22d of flexible sleeve 22 disposed remotely of end 22b. Groove 100 extends in opposite dirctions from a groove interrupting abutment or stop 102 formed integrally with flexible sleeve 22 and communicates with a mounting/guide opening 104, which extends radially through the flexible sleeve and is sized to loosely receive roller 96. By referring to FIG. 2, it will be understood that abutment 102 is adapted to engage with the opposite ends of ring 98 for purposes of limiting annularly directed displacements thereof within groove 100 and that the sides of guide opening 104 are adapted to engage with the axially opposite ends of roller 96 for purposes of maintaining the peripheral surface of the roller in line contact or engagement with the surface of element 90.

Figure 2:
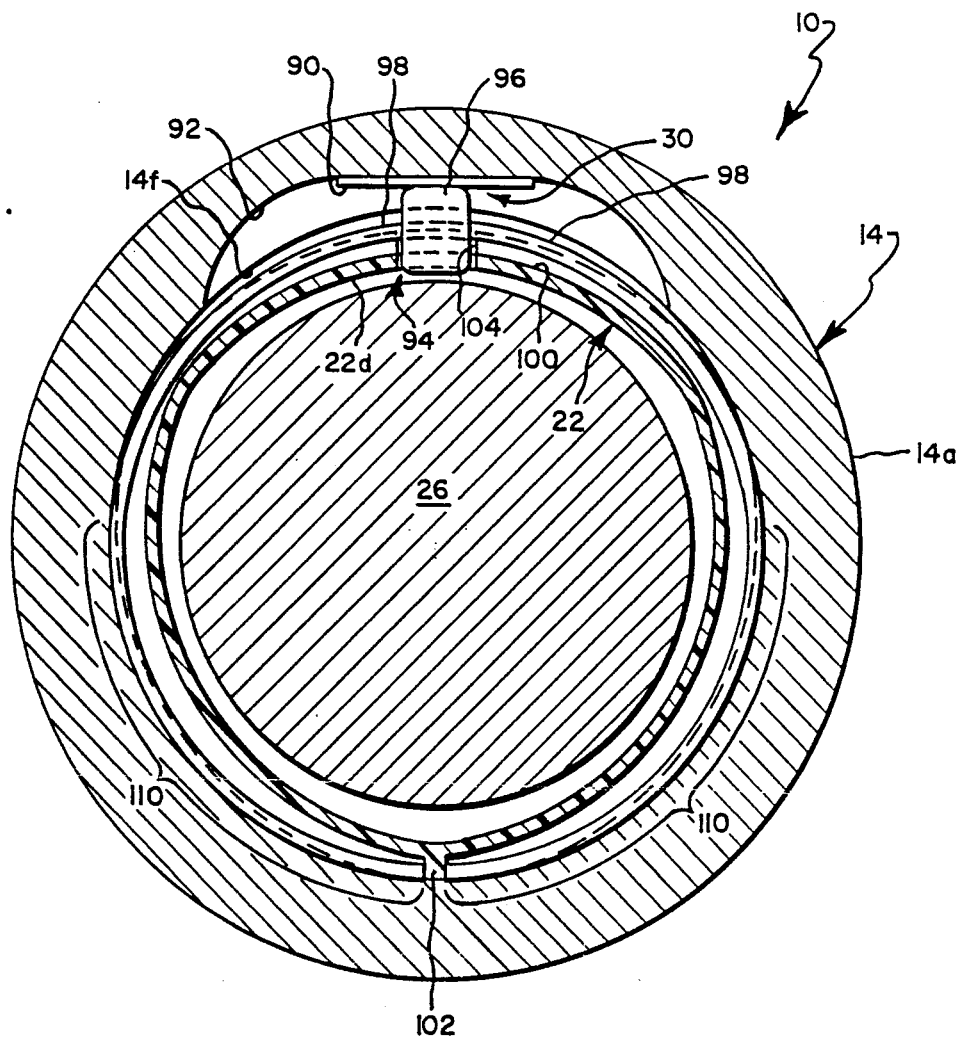
FIG. 2 is a sectional view taken generally along the line 2—2 in FIG. 1.

It will also be noted by referring to FIG. 2, that flexible sleeve end section 22d tends to assume the same cross-sectional configuration, as does that part of sleeve 22 disposed in radial alignment with rotary component 24. Thus, where rotary component 24 is provided with three roller devices 34, end section 22d is deformed outwardly at three peripherally separate portions corresponding to roller device engaged portions 22c in the manner shown in FIG. 2. C-shaped ring 98 is sized relative to roller 96, groove 100, bore 14f and recess 92 to allow for deformation of end section 22d, while at the same time ensuring that roller 96 is maintained in constant contact with element 90 regardless of the cross-sectional configuration of such second end at any point in time. As indicated in FIG. 2, the arrangement is such that the free ends of ring 98 are disposed in close proximity to abutment 102 and the radial outer surfaces of such ring extending annularly thereof from adjacent such free ends throughout arcuate extents of about 90° to 120°, as designated generally at 110 and 110, are disposed in frictional engagement with the surface of bore 14f, whereas the remaining arcuate extent or central portion of the ring is free from engagement with the casing and serves to resiliently bias roller 96 into engagement with element 90. The depth of groove 100 and the wire diameter of ring 98 is preferably such that the bottom surface of the groove is free from engagement with the radial inner surface of the ring throughout their respective extents. However, if engagement should occur, it will only be in the area of the central portion of the ring and simply serve to momentarily increase the force otherwise exerted by roller 96 on element 90 each time a radially outwardly deformed portion of sleeve 22 sweeps along such central portion. The width of groove 100 is sufficient to permit free relative radial movements between sleeve 22 and ring 98, while being effective in maintaining the ring to lie within a plane disposed essentially normal to rotational axis 40, and the axially extending dimension or length of guide opening 104 relative to the width of the groove is such that the peripheral surface of roller 96 is free from rubbing engagement with the sleeve when the ring is positioned within the groove. In that potentiometer 30 requires the application of only a relatively small force by roller 96 on element 90 to provide effective signals, the force exerted by ring 98 on the inner surface of bore 14f is also small, such that there is created little frictional drag opposing axial displacement of sleeve 22.

Any suitable means may be coupled to control element 90 for purposes of applying a desired voltage thereto and measuring the voltage gradient resulting from contact of roller 96 therewith, so as to provide a suitable signal indicative of the position of the force applying element and thus rod 18. Reference may be made to U.S. Pat. No. 3,895,288 for a disclosure of the construction of a touch actuated control element and means for measuring a voltage gradient.

In describing the mode of operation of actuator 10, it will be assumed that rod 18 is initially disposed in its fully retracted position shown in FIG. 1, which may be defined for example by engagement of sleeve end section 22d with end section 14b or by a signal generated by potentiometer 30, which deenergizes motion 26. Upon energization of motor 26, drive shaft 26e and thus shaft 38, is driven to effect rotational movement of roller devices 34 relative to cage 32. Rotational movement of roller devices 34, while in deforming engagement with the rotationally fixed flexible sleeve 22, causes the roller devices to roll annularly of the sleeve such that cage 32 rotates and the points of engagement between threaded portions 20a and 22a move in an annular direction, whereupon the sleeve and rod 18 are displaced axially relative to the axially and rotatably stationary or fixed outer threaded portion 20a. Axial displacement of flexible sleeve 22 continues until rod 18 assumes a fully extended position determined for example by engagement of sleeve end section 22b with end section 14c, or by a signal generated by potentiometer 30, which deenergizes motor 26. Upon reversal of motor 26, sleeve 22 and rod 18 will be returned to their initial retracted position. If desired, movement of rod 18 may be arrested in any position intermediate the opposite ends of its stroke, i.e. its fully retracted and extended positions, by simply deenergizing motor 26, and any such position may be easily determined by use of a rod position indicating signal generated by potentiometer 30.

The nature of the cantilever support afforded motor 26 by end section 14b and the cantilever support afforded rotary component 24 by the motor allows for slight radial displacements of the rotary component, as required to account or compensate for a lack of perfect concentricity between internally threaded portion 20a, sleeve 22a and the rotary component.

In the illustrated construction, it is preferable that the as-formed outside diameter of inner threaded portion 22a is slightly greater than the inside diameter of outer threaded portion 20a, such that a minimum degree of flexing of the sleeve 22 is required to effect driving engagement between threaded portion 20a, and 22a with a view to maximizing operational life of the sleeve. However, the outside diameter of sleeve 22 must be sufficiently small to ensure that thread portion 22a is removed from engagement with thread portion 20a intermediate roller devices 34. In the event that it is desired to modify actuator 10 to provide same with a "fail-safe" characteristic, as disclosed in U.S. Pat. No. 4,557,153, it would of course be necessary to provide threaded portion 22a with an as-formed outside diameter, which is less than the inside diameter of outer threaded portion 20a in order to permit uncoupling of the threaded portions.

It is contemplated that various changes can be made in the illustrated construction including, as by way of example, the outer threaded portion 20a may be supported for power driven rotary movement relative to actuator housing 14 for purposes of providing for adjustments and/or rapid movements of the sleeve 22 for various purposes, so long as means are also provided to selectively lock or constrain the outer threaded portion against rotation, when it is desired to permit normal operation of the actuator in the manner previously described.

What is claimed is:

1. A rotary/linear actuator comprising in combination:
- a resiliently deformable sleeve having an externally screw threaded portion;
- means for constraining said sleeve against rotary movement, while permitting axial linear movement thereof;
- means defining an internally screw threaded portion disposed radically outwardly of said sleeve and fixed against rotary and axial linear movement;
- rotary means fixed against axial linear movement and arranged inwardly of said sleeve for engagement with an inner surface thereof for resiliently deforming peripherally separate portions of said externally screw threaded portion into engagement with said internally screw threaded portion, whereby upon rotation of said rotary means relative to said sleeve, said sleeve is linearly displaced between retracted and extended positions thereof relative to said internally screw threaded portion; and
- a motor having a casing and drive means for effecting rotation of said rotary means;
- bearing means for rotatably supporting said rotary means on said casing, said motor is sized to be freely received within said sleeve, said sleeve has an axial length exceeding the axial length of said rotary means, and said sleeve is disposed outwardly of both said rotary means and said motor at least in said retracted position thereof and radially outwardly of said rotary means in all positions thereof intermediate said retracted and extended positions.

2. An actuator according to claim 1, wherein said actuator includes a touch controlled potentiometer having a touch sensitive element disposed radially outwardly of said sleeve and in radial alignment with said motor to extend in a direction in alignment with the linear displacement of said sleeve, and a force applying means carried by said sleeve and arranged for continuous engagement with said element during movement of said sleeve between said retracted and extended positions.

3. An actuator according to claim 2, wherein said force applying means is a roller resiliently biased into engagement with said element.

4. A rotary/linear actuator comprising in combination:
- an elongated actuator housing having a central section and a pair of end sections affixed to opposite ends of said central section;
- an internally screw threaded portion carried inwardly of said central section and fixed against rotary and linear movement relative thereto;
- a motor having drive means and opposite ends, said motor having one of said opposite ends cantilever supported by one of said end sections and said motor extending from said one of said end sections freely within said central section intermediate said one of said end sections and said internally screw threaded portion;
- rotary means; bearing means for cantilever supporting said rotary means on the other of said opposite ends of said motor to dispose said rotary means in radial alignment with said internally screw threaded portion, said rotary means being driven by said drive means of said motor for rotation about an axis extending lengthwise of said central section;
- a resiliently flexible sleeve having a externally screw threaded portion and opposite end portions, said rotary means engaging with an inner surface of said sleeve for resiliently deforming peripherally separate portions of said externally screw threaded portion into engagement with said internally screw threaded portion for effecting displacements of said sleeve in alignment with said axis between retracted and extended positions upon rotation of said rotary means by said drive means of said motor, said sleeve when in said retracted position being disposed radially outwardly of both said rotary means and said motor and when in said extended position being disposed radially outwardly of at least said rotary means;
- a member displaceable with said sleeve in a direction in alignment with said axis in response to movement of said sleeve between said retracted and extended positions and projecting outwardly of said housing through the other of said end sections; and
- means for constraining said sleeve against rotational movement about said axis.

5. An actuator according to claim 4, wherein said means for constraining said sleeve against rotational movement is disposed intermediate said internally screw threaded portion and said other of said end sections and engages with one end portion of said sleeve disposed remotely of said one end section of said housing.

6. An actuator according to claim 5, wherein said actuator includes a touch controlled potentiometer having a touch sensitive element carried by said central portion to extend in alignment with said axis intermediate said internally threaded portion and said one of said end sections and a force applying means carried by said sleeve adjacent an end portion of said sleeve disposed opposite to said one end portion thereof.

7. An actuator according to claim 6, wherein said force applying means includes a roller journalled by a resiliently deformable ring biasing said roller into engagement with said element; and said sleeve is formed with a through aperture for loosely receiving said roller and an annularly extending and radially outwardly opening groove for positionally locating said ring within a plane disposed essentially normal to said axis and effecting movement of said ring with said sleeve between said retracted and extended positions.

8. An actuator according to claim 4, wherein said central section has a stepped bore opening formed with an inner portion extending from adjacent said internally screw threaded portion and an outer portion disposed adjacent one of said ends of said central section said inner and outer portions being connected by an annular surface and said outer portion being formed with an annular mounting groove; and said one of said end sections is clamped against said annular surface by a resiliently deformably retaining member fitted within said mounting groove and has a sleeve portion sized to be slidably received within said inner portion and to slidably received said motor.

9. An actuator according to claim 8, wherein said central section is formed with a recess opening inwardly and extending axially of said inner portion; and said actuator includes a touch controlled potentiometer having a touch sensitive element fixed within said recess and extending lengthwise thereof and a force applying means carried by said sleeve for engagement with said element during movement of said sleeve between said retracted and extending positions, and said force applying means is defined by a roller arranged for rolling engagement with said element and loosely received within an aperture opening radially through said sleeve, said roller is journalled by a resiliently deformable C-shaped ring positionally located relative to said sleeve by an annularly extending and radially outwardly opening groove formed in said sleeve.

10. An actuator according to claim 4, wherein the cantilever support afforded said motor by said one end section and said rotary means by said motor allows radial displacements of said rotary means sufficient to compensate for lack of concentricity of said rotary means and said internally screw threaded portion.

* * * * *

UNITED STATES PATENT AND TRADEMARK OFFICE
CERTIFICATE OF CORRECTION

PATENT NO. : 4,848,184

DATED : July 18, 1989

INVENTOR(S) : Otmar M. Ulbing

It is certified that error appears in the above-identified patent and that said Letters Patent is hereby corrected as shown below:

Col. 1, line 30 - after "stroke" insert -- or --.

Col. 4, line 20 - "caee" should be -- cage --.

Col. 8, line 47 - "effectiving" should be -- effecting --.

Col. 9, line 2 - "extending" should be -- extended --.

Signed and Sealed this

Seventeenth Day of July, 1990

Attest:

HARRY F. MANBECK, JR.

*Attesting Officer*  *Commissioner of Patents and Trademarks*